(No Model.)
W. MEYER.
WASHING MACHINE.
No. 252,493. Patented Jan. 17, 1882.
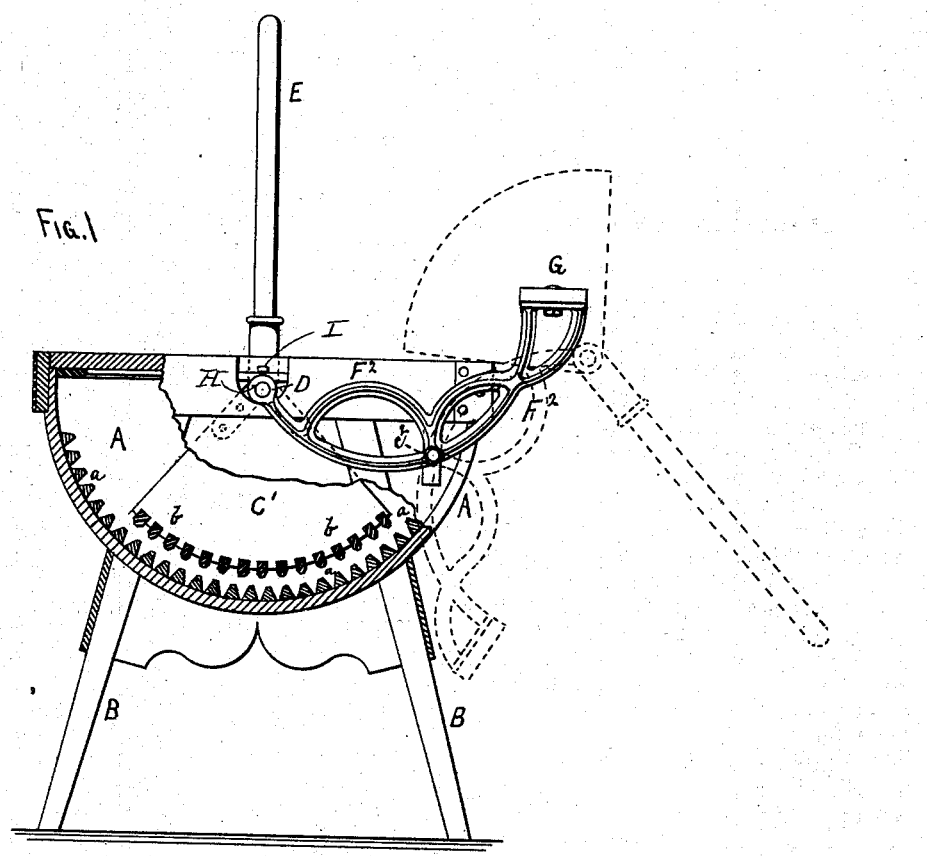
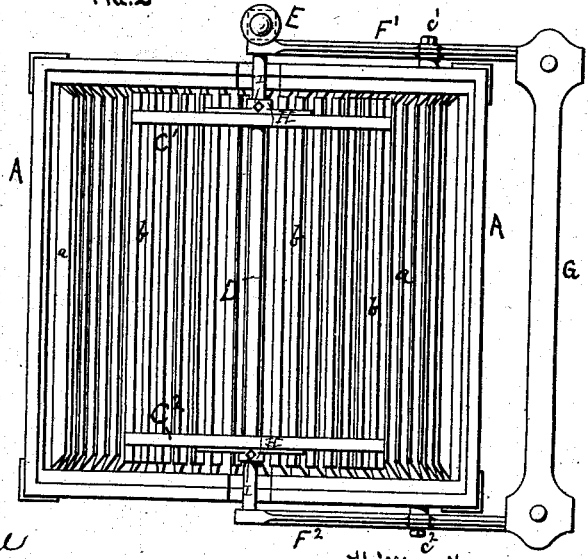
WITNESSES.
P. B. Crandall
Warren H. Mead
William Meyer
INVENTOR, By
Louis Feeser & Co., Att'ys.

UNITED STATES PATENT OFFICE.

WILLIAM MEYER, OF AFTON, MINNESOTA.

WASHING-MACHINE.

SPECIFICATION forming part of Letters Patent No. 252,493, dated January 17, 1882.

Application filed April 21, 1881. (No model.)

*To all whom it may concern:*

Be it known that I, WILLIAM MEYER, a citizen of the United States, residing at Afton, in the county of Washington and State of Minnesota, have invented certain new and useful Washing-Machines, of which the following is a specification.

This invention relates to washing-machines, and has for its object the easy separation of the rubber from its shaft and the changing of the angle at which the handle shall stand to the rubber, for the purposes hereinafter set forth, and by the means sought to be specifically defined by the claim.

In the accompanying drawings, Figure 1 is a sectional side elevation, and Fig. 2 is a plan view.

A is a semicircular tub or receptacle, having ribs $a$ secured across its bottom and mounted upon legs B.

$C'$ $C^2$ are two segmental plates pivoted at their centers to a shaft, D, running across the machine, and with their lower edges curved parallel with the tub A, as shown, and having ribs $b$, connecting the two segments, the whole thus forming a rubber which may be oscillated by a handle, E. The segmental plates $C'$ $C^2$ are provided each with a hub, H, through which a thumb or set screw, I, is passed, so as to bear against the shaft, and thereby hold the rubber securely thereto. When it is desired to disconnect the rubber from the shaft for the purpose of repairing the same or substituting another therefor, or for any other purpose whatever, the set-screws have only to be loosened, the shaft disconnected at one end from the lever $F^2$, and the rubber then slipped endwise from off its shaft; and when the angle at which the handle shall stand with reference to the rubber is to be fixed so as to accommodate it to the height of the operator, or for change of position, so as to afford the ease or rest for the operator resulting from such change, the screws have only to be loosened and the rubber turned on its axis and then secured thereto by tightening the screws, and then the rubber, when by gravitation it swings down so as to be pendent, throws the handle at an angle to a perpendicular, the degree of the angle depending on the point in the circumference of the shaft at which the set-screws secure the rubber thereto.

$F'$ $F^2$ are two curved levers, pivoted at $c'$ $c^2$ to the outside of the tub A, upon either side, and journaled upon the ends of the shaft D, and connected to each other by a handle, G, so that by depressing or elevating the levers $F'$ $F^2$ the rubber may be raised or lowered, and by depressing the handle G far enough the whole rubber may be raised up out of the tub and turned over upon its back, as shown by dotted lines in Fig. 1, to leave the tub unobstructed for the insertion or removal of the clothes.

The rubber is so suspended that its ribs $b$ will not touch the ribs $a$ of the tub. Hence the clothes will never be torn or harshly rubbed; but a motion very similar to hand-rubbing is obtained. By this arrangement any desired pressure may be brought to bear upon the clothes, so that the machine may be adapted to any kind of fabric or goods.

I lay no claim, broadly, to means for disconnecting the rubber from its shaft, nor to means for securing the shaft to the tub, as various devices have been used for both purposes; but

What I claim as new is—

The combination, with tub A and levers $F'$ $F^2$, hinged thereto, and connected together by bar G, of the shaft D, provided with handle E, and journaled in arms $F'$ $F^2$, and the segmental rubber secured adjustably to shaft D by set-screws I, passed through hubs H, whereby the rubber can be not only detached from its shaft, but the angle of the handle with reference to the rubber can be altered by the same means, as set forth.

In testimony whereof I have hereunto set my hand in the presence of two subscribing witnesses.

WILLIAM MEYER.

Witnesses:
C. N. WOODWARD,
LOUIS FEESER.